Nov. 5, 1935. W. LEATHERS 2,020,120
VACUUM CLEANER FILTER
Original Filed Oct. 17, 1930  4 Sheets-Sheet 3
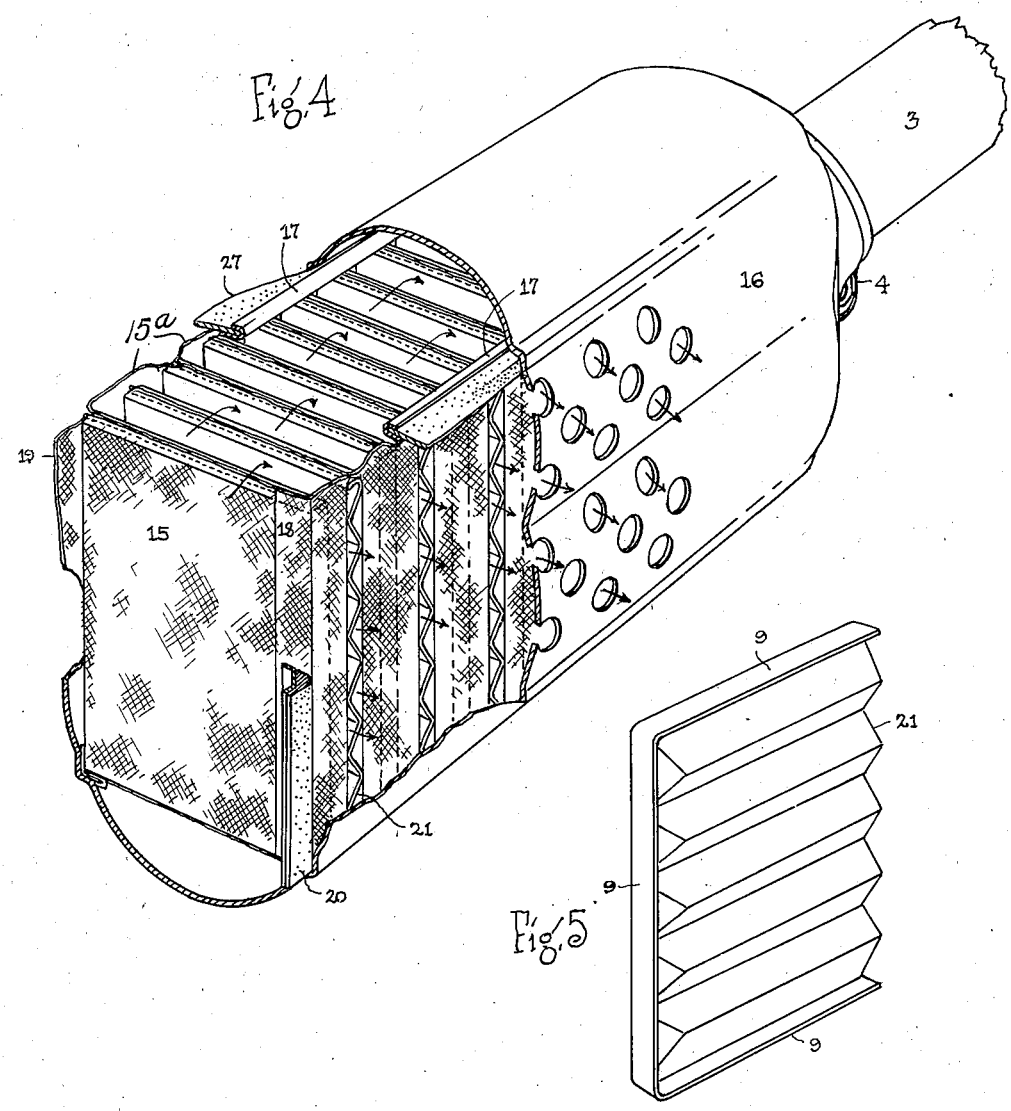

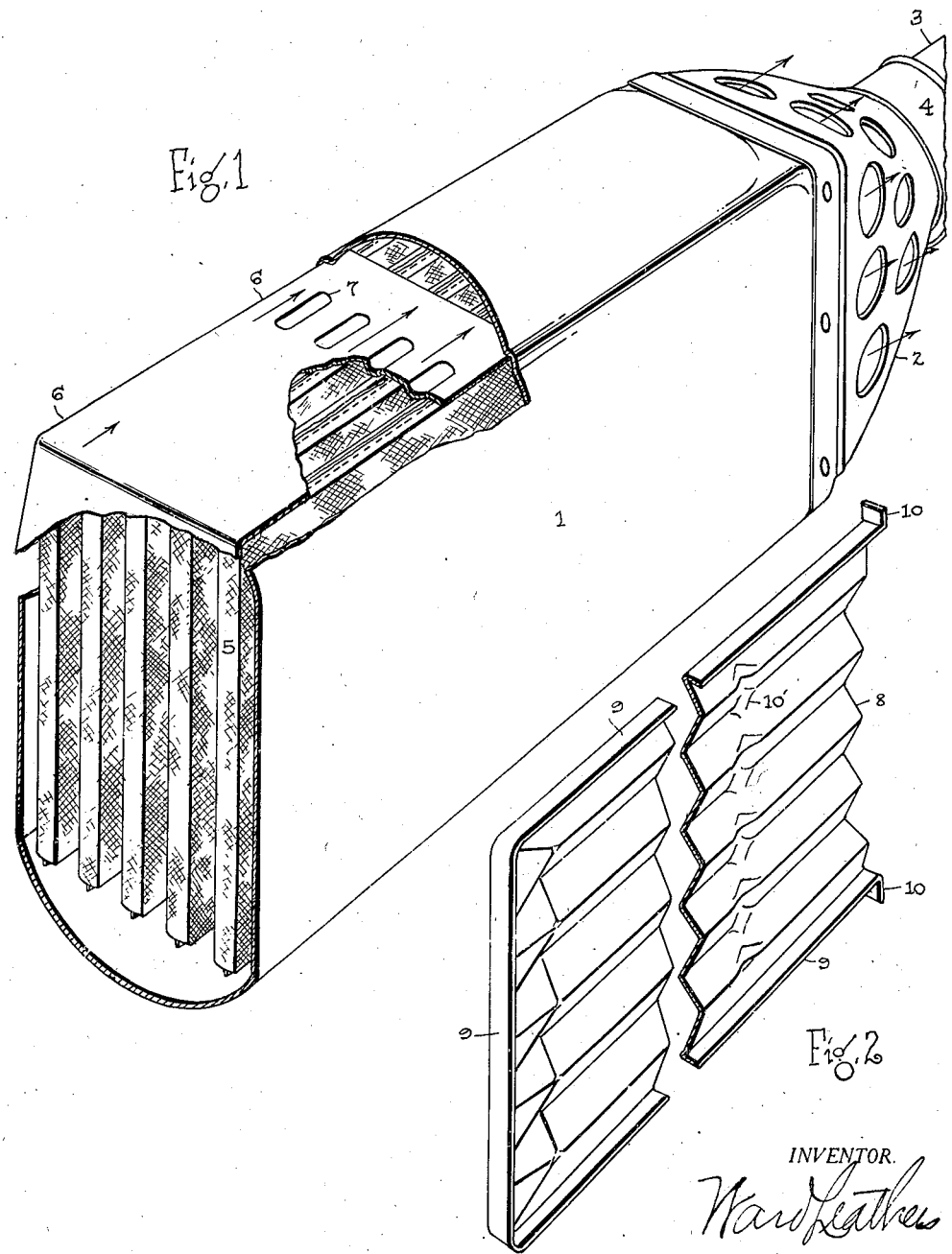

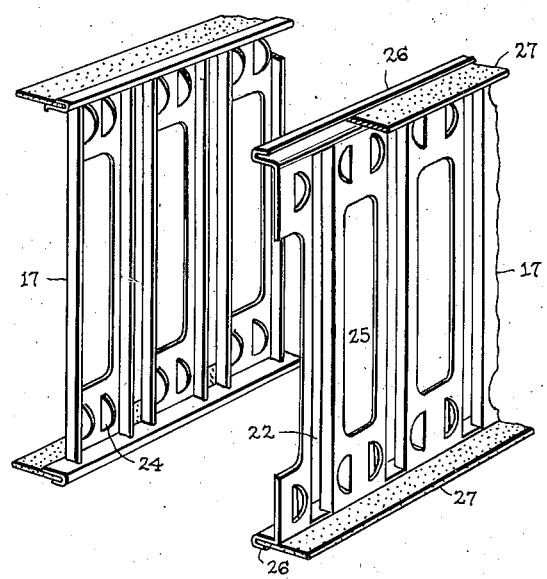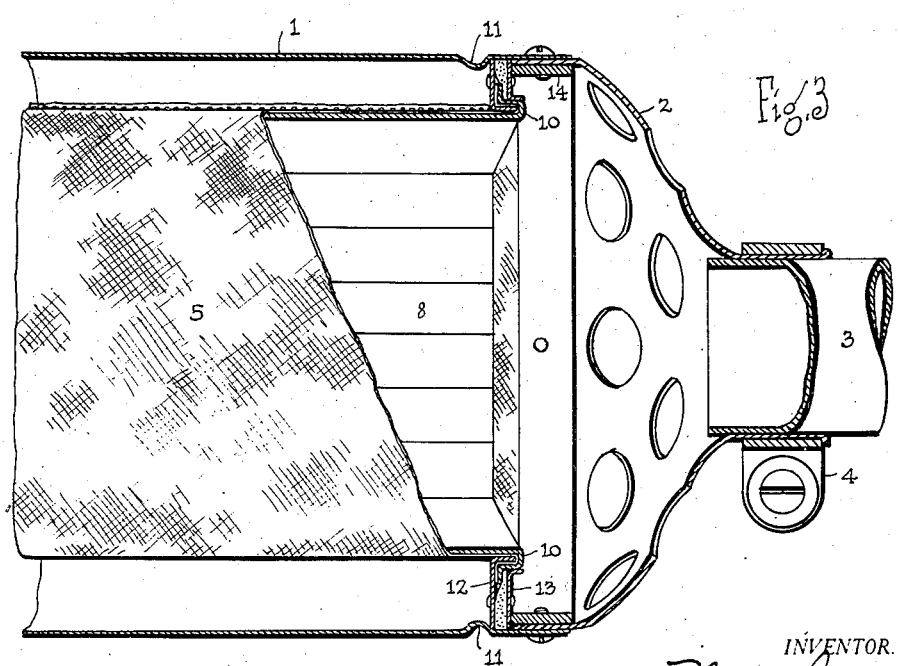

Nov. 5, 1935.  W. LEATHERS  2,020,120
VACUUM CLEANER FILTER
Original Filed Oct. 17, 1930  4 Sheets-Sheet 4
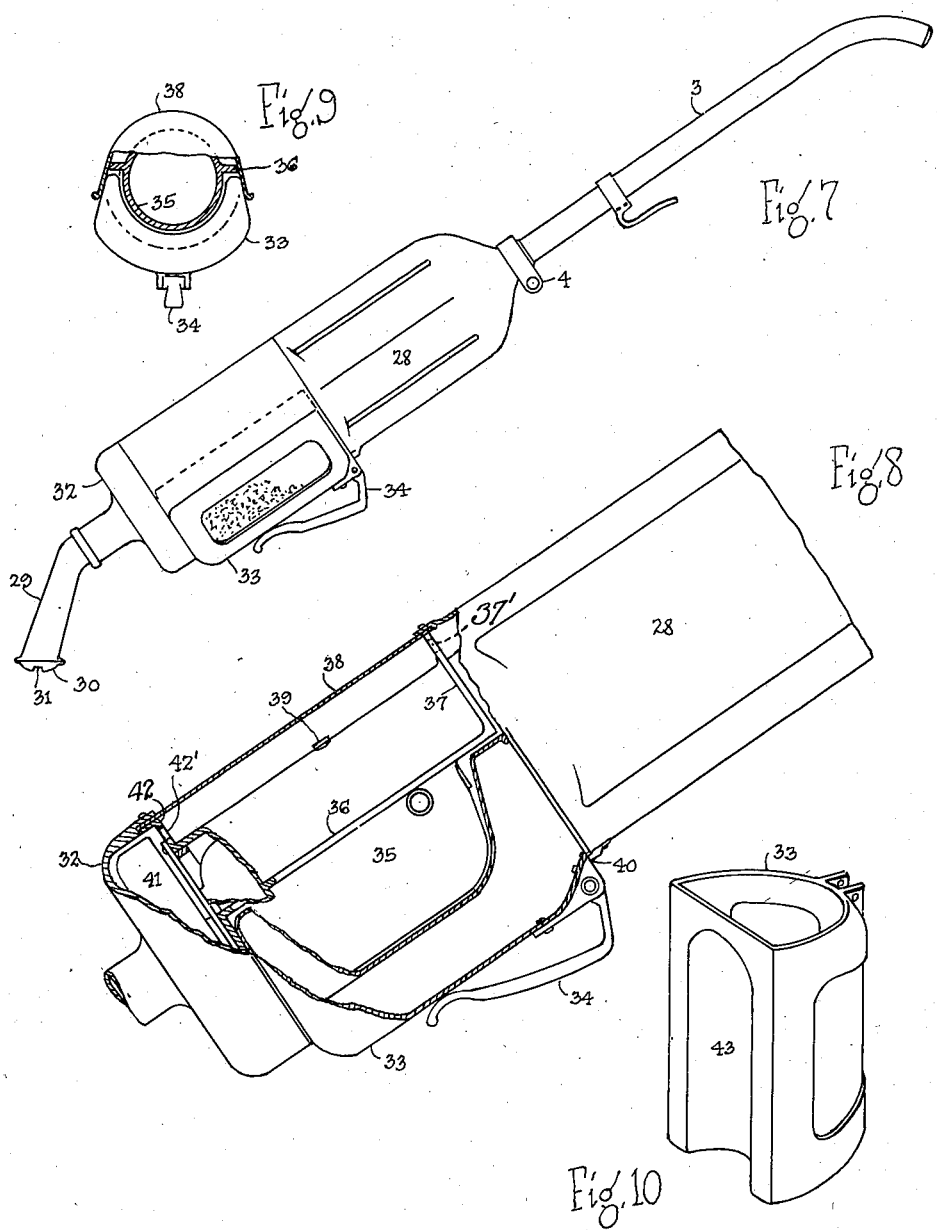

Patented Nov. 5, 1935

2,020,120

UNITED STATES PATENT OFFICE 2,020,120

VACUUM CLEANER FILTER

Ward Leathers, Haworth, N. J., assignor, by mesne assignments, to The Quadrex Corporation, a corporation of Delaware Application October 17, 1930, Serial No. 489,281
Renewed December 29, 1933

7 Claims. (Cl. 183—36)

The object of my invention is to produce a vacuum cleaner wherein the dirt is filtered from the air in the smallest compass and in the neatest, lightest device of simple and inexpensive manufacture.

The type of filter I have invented for this purpose is radically different from any other filter, the difference consisting primarily in the fact that filter bags are used but clean air is filtered into the bags while the dirt remains on the outside.

Another feature of primary importance is the conducting of the dirt laden air between these bags in such manner that the air moves essentially in the same direction as gravity, permitting the dirt to fall out at the bottom, where it may be collected without clogging the interstices between said bags.

Another important principle involved in my invention is that of spacers within the bags. The spacers resist the collapsing of closely adjacent sides and leave the free, clean air exhaust at the ends of the bags.

I have set forth my invention in complete and understandable form so that all those familiar with these arts may clearly understand, and in order to make the following specification clear, have appended drawings of which—

Figure 1 is a partially sectioned perspective view of a vacuum cleaner filter embodying one form of my invention.

Figure 2 is a partially sectioned perspective view of a filter bag spacer.

Figure 3 is a view partly in section and partly in elevation of the right hand end portion of the filter shown in Figure 1.

Figure 4 is a partially sectioned perspective view of another form of filter assembly embodying my invention.

Figure 5 is a filter bag spacer used in the filter shown in Figure 4.

Figure 6 is a detail of the stiffener spacer separators used in the assembly shown in Figure 4.

Figure 7 is a side elevation of a vacuum cleaner with one of the filters located in position for use.

Figure 8 is an enlarged view of the lower portion of the device shown in Figure 7 the parts being shown in cross section.

Figure 9 is a combined end elevation and cross sectional view of the lower part of the device shown in Figure 7.

Figure 10 is a perspective view of a dirt receptacle used in connection with the device shown in Figure 9.

In Figure 1, 1 is a longitudinal casing. 2 is a detachable perforated end for the casing which permits the exhausting of air in any suitable manner. The air may pass out through it, or it may pass out through the hollow handle as desired, or both. The filter is assembled and slid into the housing 1 from the handle end. The part 2 may properly be clamped to the handle 3 by the screw clamp 4 before the filter is in the casing 1. The part 2 may then be attached to 1 in any suitable manner, as by screws. Any desired number of filter bags may be used. I have found it practical to use five, as illustrated. The bags 5 may be made of thin filter cloth, such as China silk, or other suitable material, and may be sewn along the top and the bottom, or may be sewn along the top and down the enclosed end, or may be sewn along the bottom and the end.

An air deflector or shield 6, shown broken away in Figure 1, loosely covers the filter bag unit within the casing at the dirt laden air inlet end of the filter so as to deliver the dirt laden air toward the upper end of the filter. The purpose of this is to prevent the air movement during the filtering process from interfering with the settling of the dirt by gravity. Suitable depressions 7 in the deflector 6 may serve as spacers for the air bags 5.

Figure 2 shows a sheet metal stamping 8 which is pushed into each of the air bags 5 from the end thereof. The stamping 8 has stiffening shoulders 9 and any form of depressions or convolutions, or openings on its major area which will hold the two sides of the bag apart from one another and yet allow the freest flow of filtered air to the mouth of the bag. Lugs 10 permit of locking the part 8 into the assembly (as shown in Figure 3).

The metal stamping 8 may be provided with flat areas 10' where desired to add vertical stiffening preferably at places of support or spacing.

In Figure 3, which is a longitudinal section of the handle end of the filter assembly of Figure 1, it will be noted that a shoulder 11 in the casing 1 may be used as a stop. Each filter bag 5 with its inner spacer 8 is passed through a shouldered hole (of which there are five, one for each bag) in a cross-plate 12 and the fabric turned back over the shoulder thereof. A locking plate 13 may be riveted to the plate 12 with felt between, the shouldered openings in the two plates registering in such manner that they close the entire space between the filter bags and the casing 1. The felt shown therebetween may be allowed to project at its juncture with the casing 1 just sufficient to make a dust tight juncture. When the five bags 5 with their spacers 8 are assembled with the plates 12 and 13, they form a separate and independent assembly which may easily be mounted in the housing 1 and anchored therein by the casing end 2 to which there is a pre-fastened ring 14 having threaded holes for purposes of closing, as indicated.

Figure 4 shows a longitudinal view of a modified filter using the same principles as those described under Figure 1 but having as its modification, the passing of the bags transversely instead of longitudinally.

Owing to the fact that the bags 15 are crosswise, the air exhaust is naturally on the sides and may be permitted free exit through ports or perforations in the sides of the casing 16. In this case, the bags are shown made in multiple strips. They may be in one, or in two series. With one series, the air will all exhaust on one side, with two series, as shown, staggered and interspaced, the exhaust from one series is on one side of the housing and the exhaust from the other series is on the other side. Referring to Figure 4 it is seen that there are two series of bags 15 extending transversely of the casing. Each series is made by folding a continuous strip of fabric upon itself at spaced intervals to form a plurality of the bags 15, these bags being connected by the unfolded portion of the fabric as indicated at 15a. Each one of the folded portions is stitched along its top and bottom edges closing these edges and leaving a bag which is open at one end only. As shown in Figure 4 two series of such bags are provided arranged oppositely so that the bags 15 of each series are disposed in alternation and in the spaces between the bags of the opposite series so that the bags of the two series open to the opposite sides of the casing. A separator 21, shown in Figure 5 (similar to the separator shown in Figure 2) is inserted into each bag through the open end thereof and the bags are then assembled between the stiffener spacer separator members 17 which are located on opposite sides of the two series of bags. The stiffener spacer separator members 17 are shown in detail in Figure 6.

By this construction the two series of bags are connected together as a unit and the parts firmly held in position and can therefore be mounted in the housing 16 by inserting the unit from either end. The end of the fabric 18 may be pasted to the end bag while the end of the fabric 19 may be caught under a suitable dust protector as at 20 which may be made in any desired form preferably of stamped metal and felt. It should be clearly noted that the dust-laden-air is deflected primarily to the top of the casing 16 so that it may pass downward between the bags 15 dropping the dirt into the bottom of the casing 16.

The stiffener spacer separators 17 are preferably made of stamped sheet metal with slots 22 through which the bags 15 are passed from the outside. When all the bags are passed through their respective slots, they are properly spaced on the far ends by lugs shown at 24. Ventilator openings 25 permit the filtering function of that continuous portion of the fabric which joins one bag to another. 17 is provided with channels 26 top and bottom into which felts 27 are clamped. All parts of 17 may easily be stamped from the same metal sheet. The felts 27 make dust-tight corners, as clearly shown in Figure 4.

Figure 7 shows a side elevation of a vacuum cleaner with the filter element of Figure 1 or Figure 4 incorporated therein at 28. The nozzle 29 is preferably of stamped sheet metal with a bottom face 30 crimped thereto. The opening 31 consists of a series of depressed ports having such size as will properly limit size of object permitted entrance to the cleaner. Slight ridges may be depressed along the front and rear edge of the face of 30 to avoid too much vacuum inside. This nozzle 29 is attached in any suitable manner to the blower casing 32. A dirt receptacle 33 is set into a holder at the bottom consisting of a slight recess and is then pushed in at the top. It is latched in place by suitable handle latch 34. It is essential that the dirt receptacle be on the bottom side of the cleaner in this arrangement in order that the dirt may fall into it from the bottom side of the filter 28.

Figure 8 shows in detail and on a larger scale the arrangement of motor, motor-housing, filter support, filter and dirt receptacle as illustrated generally in Figure 7. Here, a motor-housing 35 is shown cast (sand or die) with side wings 36 thereon. The side wings are integral with the housing 35 and also integral with the top plate 37 which is used as a means of support for the filter 28 and for the outer air duct cover 38. The wings 36 are offset from the center of 35 as shown in Figure 9 sufficient to allow for motor brushes and bearings. The electric conductors may enter the housing 35 at any suitable location, such as 39. This cord may be carried from this location upward through the top of the filter and continue upward through a hollow handle to any suitable outlet provided with switch. In the top plate 37 there are provided suitable air ports for permitting the dirt-laden-air to enter the upper portion of the said filter. The handle 34 provides means for holding the dirt receptacle 33 for emptying purposes and of course the closing of the handle 34 securely holds the receptacle in place. Air from the blower 41 is permitted to enter the chamber between 36 and 38 through suitable ports 42' arranged in the upper portion of the plate 42 which is shown cast integral with the part 35.

Figure 9 is a diagrammatic partial cross-section of Figure 8 taken approximately midway of the motor and illustrates the sloping contact faces between the dirt receptacle and the outer housing. These faces may be provided with felt liners if desired, in order to make them reasonably dust tight. It also illustrates the fact that the flanges 36 are off center and shows how the underside may be utilized by the dirt receptacle.

Figure 10 shows the dirt receptacle 33 in perspective. A suitable recess 43 surrounds the motor housing while transparent windows show the user the quantity of dirt accumulated.

Having set forth my invention so fully that all those familiar with these arts may understand, I wish it understood that its broad principles may be applied in many and devious forms without departing from the spirit of my invention.

I claim:—

1. A filter of the class described comprising a housing containing an upper passage for dirt laden air and a lower passage for dirt and communicating passages therebetween both sides of which are of filter material, and a shield loosely covering the entrance mouths of the communicating passages at one end of the filter but leaving unobstructed those at the other end of the filter.

2. A filter of the class described comprising a housing containing an upper longitudinal passage for dirt laden air and a lower longitudinal passage for dirt, and a multiplicity of substantially vertical communicating passages between said upper and lower passages, having, as sides, areas of filter material, said areas having rigid separators between adjacent pairs of said side areas on the air exit face of said filter material, and a shield loosely covering the entrance mouths of the communicating passages at one end of the filter but leaving unobstructed those at the other end of the filter.

3. In a vacuum cleaner having a motor blower unit, a handle supporting a filter housing containing an upper passage for dirt laden air and a lower passage for dirt, with a multiplicity of substantially vertical cloth walled communicating passages therebetween, a dirt receptacle communicating with said lower dirt passage, the dirt laden air from said motor blower being directed to said upper air passage.

4. In a vacuum cleaner, a filter housing, a plate dividing said housing into chambers, a plurality of filter bags uprightly disposed side by side in one of said chambers, distending elements located within said bags, said plate being provided with a plurality of upright openings registering with and fitted to the mouths of said bags, the other of said chambers receiving the filtered air from the inside of said filter bags and being arranged to deliver the filtered air to the atmosphere.

5. The device as specified in claim 4 in which the bag distending elements each comprises a body portion formed with elevations and depressions in opposite faces, said body portion being provided with a rim, said rim and said elevations being arranged to engage and prevent collapse of the walls of the bag.

6. The device as specified in claim 4 in combination with means for delivering dust laden air to the filter housing at the top of the bags and having a dirt removal outlet at the bottom of the housing.

7. The device as specified in claim 4 in which said plate and filter bags constitute a unitary structure insertable into the filter housing through one end thereof there being a substantially dust-tight fit between said plate and the inside of said housing, a cover for the end of said housing, and a handle for the vacuum cleaner supported by said cover.

WARD LEATHERS.